US010935634B2

(12) United States Patent
Vermeulen (10) Patent No.: US 10,935,634 B2
(45) Date of Patent: Mar. 2, 2021

(54) IN SITU VERIFICATION OF GUIDED WAVE RADAR DEVICE

(71) Applicant: Endress+Hauser SE+Co. KG, Maulburg (DE)

(72) Inventor: Rob Vermeulen, Greenwood, IN (US)

(73) Assignee: Endress+Hauser SE+Co. KG, Maulburg (DE)

( * ) Notice: Subject to any disclaimer, the term of this patent is extended or adjusted under 35 U.S.C. 154(b) by 328 days.

(21) Appl. No.: 15/995,466

(22) Filed: Jun. 1, 2018

(65) Prior Publication Data

US 2019/0369209 A1    Dec. 5, 2019

(51) Int. Cl.
  *G01S 7/40*  (2006.01)
  *G01S 7/4865*  (2020.01)
  *G01S 13/88*  (2006.01)
(52) U.S. Cl.
  CPC .............. *G01S 7/40* (2013.01); *G01S 7/4865* (2013.01); *G01S 13/88* (2013.01)

(58) Field of Classification Search
  CPC .......... G01S 7/40; G01S 7/4865; G01S 13/88; G01S 7/4052; G01F 25/0076
  USPC ................................................. 342/93, 174
  See application file for complete search history.

(56) References Cited

U.S. PATENT DOCUMENTS 9,571,163 B1 * 2/2017 Assem ................. H04B 17/318
2016/0025840 A1 * 1/2016 Steward ................. G01S 13/10
  342/93

* cited by examiner

*Primary Examiner* — Bo Fan
(74) *Attorney, Agent, or Firm* — Mark A. Logan; Endress+Hauser (USA) Holding Inc.

(57) ABSTRACT

The application discloses a method for verifying the accuracy of a guided-wave radar measuring device used in process automation. The method includes sending measuring radar waves to a built-in verification circuit of a known and verified length and performing time-of-flight analysis on the measuring radar wave reflected by the built-in verification circuit. The application also discloses a guided-wave radar device having a built-in verification circuit.

16 Claims, 5 Drawing Sheets

FIG. 5

IN SITU VERIFICATION OF GUIDED WAVE RADAR DEVICE

TECHNICAL FIELD

The present disclosure relates generally to in situ verification of time-of-flight guided wave radar devices used in process automation technology.

BACKGROUND OF THE INVENTION

A conventional guided wave radar device used in process automation systems may be calibrated against a known reference, and accuracy and repeatability statements resulting from the calibration are confirmed in a calibration or verification report. The calibration is performed against a reference which itself is referenced against and traceable to a national or international standard, for instance, a standard of the National Institute of Standards and Technology.

Recent industry requirements require that guided wave radar devices used for billing or custody transfer purposes be re-calibrated and re-verified on a periodic basis. To do so, some suppliers of guided wave radar devices have developed a "verification kit" including reference cables or rods of fixed length. The guided wave radar housing and the electronics to be calibrated are detached from the wave guide, leaving the measurement rod or cable in the tank. Then the housing and electronics are connected to a known and verified reference cable or a rod with a fixed length, and the readings and outputs of the radar device are verified. After the verification, the housing and electronics are detached from the verification kit and put back into service on the tank.

A problem with this method is that a service person needs to climb the tank to separate the housing and electronics from the rod, cable, process connection, etc. mounted on the tank. This can be dangerous; the tank could leak dangerous gases during the separation process. In addition, the detaching and attaching of parts and pieces can lead to mechanical issues that in turn could lead to failure of the instrument altogether. The verification kit may not be easily available everywhere, so the radar unit may need to be sent to a central place for verification, or a verification service may need to be called to do the verification in the field. Both are cumbersome and can be expensive. Accordingly, there remains a need for further contributions in this area of technology.

SUMMARY OF THE INVENTION

According to at least one aspect of the present disclosure, a method for verifying a time-of-flight guided wave radar device that includes a built-in verification circuit is disclosed. The method includes: switching the radar device to a verification mode; connecting an output circuit of the radar device to a verification circuit of the radar device; generating a radar pulse in the radar device using the output circuit and sending the radar pulse to the verification circuit; reflecting the radar pulse from the verification circuit to a measuring circuit of the radar device after a pre-determined delay; comparing a time-of-flight of the reflected radar pulse with an expected time-of-flight of the verification circuit; and generating a verification report based on the comparison.

In some embodiments of the method, the verification circuit may include at least three pairs of conductor traces on a printed circuit board (PCB), wherein each pair of conductor traces includes a signal trace and a ground trace disposed in parallel paths on the PCB and joined at a distal end by a terminating resistor, and wherein the connecting of the output circuit to the verification circuit includes connecting the output circuit to a signal trace in one of the at least three pairs of conductor traces. In such embodiments the method may include repeating the connecting, the generating and sending, the reflecting, and the comparing for each of the at least three pairs of conductor traces. The method may further include connecting in series at least two of the at least three pairs of conductor traces by connecting the respective signal traces in series and by connecting the respective ground traces in series; and executing the connecting of the output circuit to the verification circuit, the generating and sending, the reflecting, and the comparing using the at least two conductor trace pairs connected in series.

In some embodiments of the method, the verification circuit may include a combination of electronic components configured to reflect the radar pulse after the pre-determined delay.

In some embodiments of the method, the verification circuit may include at least one coaxial cable of a verified length disposed within a housing of the radar device, and wherein the connecting of the output circuit to the verification circuit includes connecting the output circuit to the at least one coaxial cable.

In some embodiments of the method, the radar device may include a housing enclosing at least the output circuit, the housing including an external connection, wherein the verification circuit includes at least one coaxial cable of a verified length disposed outside of the housing and connected to the radar device at the external connection, and wherein the connecting of the output circuit to the verification circuit includes connecting the output circuit to the at least one coaxial cable through the external connection.

The radar device may have a measuring range, and a length of each trace of the at least three pairs of conductor traces is within the measuring range of the radar device, and a length of the at least two signal traces connected in series and a length of the at least two ground traces connected in series are each within the measuring range of the radar device.

The application also discloses a time-of-flight radar device, including: an output circuit embodied to generate a measuring radar wave; a wave guide embodied to receive the measuring radar wave from the output circuit and to guide the measuring radar wave into a medium; a measuring circuit embodied to receive a reflected measuring radar wave and to make time-of-flight measurements on the reflected measuring radar wave; a verification circuit embodied to receive the measuring radar wave from the output circuit and to reflect the measuring radar wave to the measuring circuit after a first pre-determined delay; a first switch configured to selectively connect the output circuit to the wave guide or to the verification circuit; a control circuit configured to control the output circuit, the measuring circuit, the verification circuit, and the first switch; and a housing embodied to enclose and protect at least the output circuit, the measuring circuit, the verification circuit, the first switch, and the control circuit.

In some embodiments of the radar device, the verification circuit may include at least three pairs of conductor traces on a printed circuit board (PCB) and at least three switches disposed on the PCB, wherein each pair of conductor traces includes a signal trace and a ground trace disposed in parallel paths on the PCB and joined at a distal end by a terminating resistor, and each switch may be configured to selectively connect a conductor trace pair to the first switch or to another conductor trace pair. The at least three pairs of conductor traces may be disposed on a layer of a main PCB of the radar device wherein the main PCB may include at least the output circuit and the verification circuit, or the at least three pairs of conductor traces may be disposed on a separate PCB.

In some embodiments of the radar device, the verification circuit may include at least one coaxial cable of verified length disposed within the housing.

In some embodiments of the radar device, the verification circuit may include at least one coaxial cable of a verified length disposed external to the housing and the housing may include an external connection through which the at least one coaxial cable is connected to the output circuit through the first switch.

In some embodiments of the radar device, the verification circuit may include a combination of electronic components configured to simulate a time-of-flight delay in a radar signal.

BRIEF DESCRIPTION OF THE DRAWINGS

The described embodiments and other features, advantages, and disclosures contained herein, and the manner of attaining them, will become apparent and the present disclosure will be better understood by reference to the following description of various embodiments of the present disclosure taken in conjunction with the accompanying drawings, wherein.

DETAILED DESCRIPTION

The present disclosure discloses a time-of-flight guided wave radar device having a built-in verification circuit. Various embodiments of the device will now be presented in conjunction with the figures which illustrate the embodiments, and specific language will be used to describe the same. It will be understood that no limitation of the scope of this disclosure is thereby intended.

Figure 1:
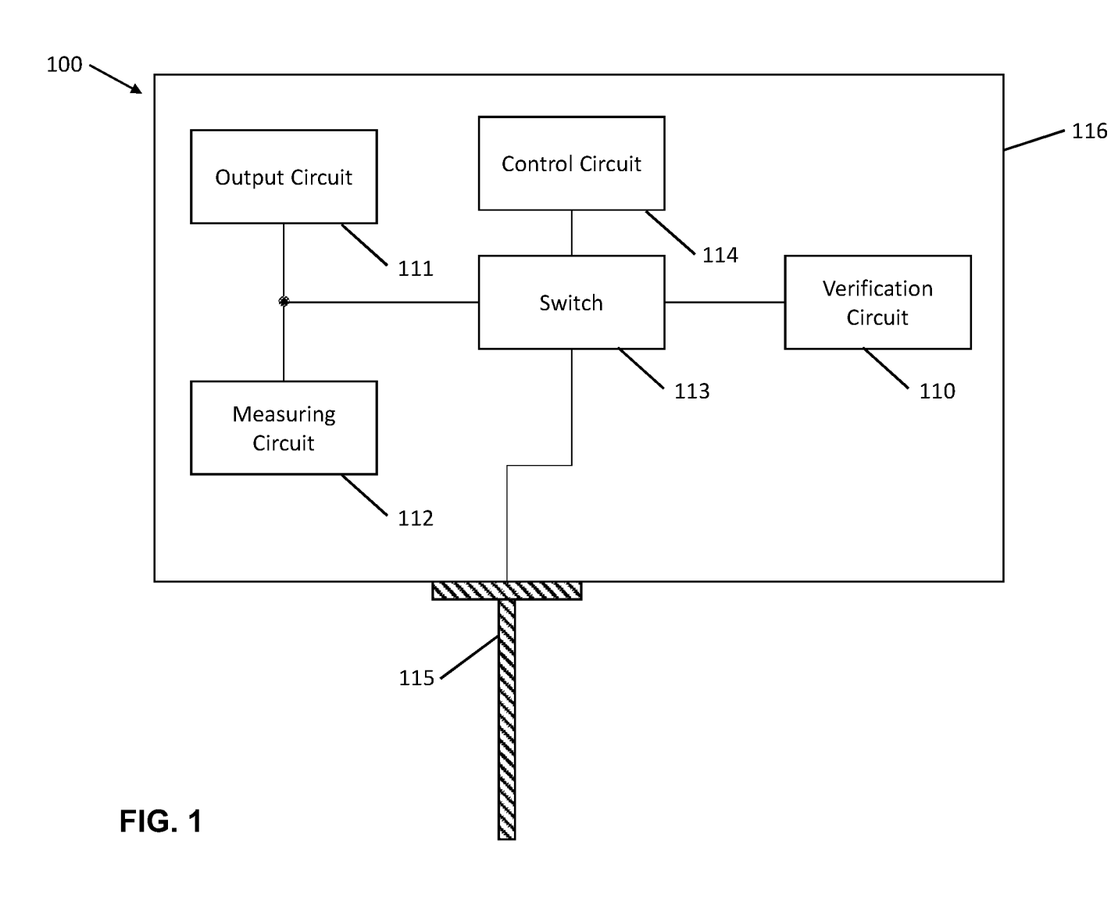
FIG. 1 shows a schematic view of a time-of-flight guided wave radar device including a built-in verification circuit according to an embodiment of the present disclosure.

FIG. 1 shows an embodiment of a guided wave radar device 100 that includes a verification circuit 110 according to the present disclosure. The verification circuit 110 enables the calibration of the radar device 100 without removing the radar device 100 from a process location where the radar device 100 is installed. The radar device 100 may include an output circuit 111 configured to produce a measuring radar wave. The radar device 100 may include a wave guide 115 embodied to guide the measuring radar wave generated by the output circuit 111 into a tank or vessel (not shown) and to guide a reflected measuring radar wave back to a measuring circuit 112 of the radar device 100. The measuring circuit 112 may be configured to receive the reflected measuring radar wave and to make time-of-flight measurements to determine the distance travelled by the reflected wave.

The radar device 100 may include a switch 113 to selectively conduct the measuring radar wave to the wave guide 115 or to the verification circuit 110. The switch 113 may be a mechanical switch or an electronic switch and may be controlled by a control circuit 114.

The radar device 100 may include a housing 116 that encloses the various components of the radar device such as the output circuit 111, the measuring circuit 112, the control circuit 114, and the verification circuit 110. The wave guide 115 may be mounted on an exterior surface of the housing 116.

The radar device 100 may be mounted on a tank or vessel, and the wave guide 115 may extend into a liquid in the tank or vessel. The radar device 100 may be operated in a measuring mode in which level measurements of the liquid are performed. When the radar device 100 is operating in the measuring mode, the control circuit 114 configures the switch 113 to conduct a measuring radar wave from the output circuit 111, through the switch 113, and to the wave guide 115. The guided measuring radar wave may travel the wave guide 115 and may be reflected at the interface of the wave guide 115 and the liquid into which the wave guide 115 is extended. The reflected measuring radar wave may be conducted back up the wave guide 115, through the switch 113, and to the measuring circuit 112.

The measuring circuit 112 may measure the time between the measuring radar wave leaving the output circuit 111 and returning to the measuring circuit 112. The measuring circuit 112 may use the measured time to calculate a distance travelled by the measuring radar wave in the path from the output circuit 111, along the wave guide 115 to the liquid in the tank or vessel, and back to the measuring circuit 112. The distance travelled then may be used to calculate a level of the liquid in the tank or vessel.

The radar device 100 may further be operated in a verification mode in which the accuracy and repeatability of the device's measurements are verified. When the radar device 100 is operating in the verification mode, the control unit 114 configures the switch 113 to conduct a measuring radar wave from the output circuit 111, through the switch 113, and to the verification circuit 110. The verification circuit 110 may be embodied to receive a measuring radar wave and to reflect the measuring radar wave back through the switch 113 to the measuring circuit 112. The verification circuit 110 may be configured to reflect the measuring radar wave after a pre-determined delay that simulates the propagation of the measuring radar wave along the wave guide 115 and the reflection of the measuring radar wave back up the wave guide 115 to the measuring circuit 112. The pre-determined delay thus simulates a known, fixed distance travelled of the measuring radar wave which thus simulates a known, fixed level in the tank or vessel.

The measuring circuit 112 may be configured to analyze the reflected measuring radar wave whether the radar device 100 is operating in the measuring mode or in the verification mode. When the radar device 100 is operating in the measuring mode, the measuring circuit 112 may determine a liquid level in the tank or vessel based on an analysis of the reflected measuring radar wave. When the radar device 100 is operating in the verification mode, the measuring circuit 112 may determine a simulated liquid level in the tank or vessel based on an analysis of the measuring radar wave that was reflected by the verification circuit 110 after the pre-determined delay. In the verification mode, the measuring circuit 112 may then compare the determined simulated liquid level with an expected simulated liquid value, and through this comparison the accuracy of the radar device 100 may be determined.

The pre-determined delay of an embodiment the verification circuit 110 may be effected by propagating the measuring radar wave received from the output circuit 111 along a pre-determined length of a conductor within the verification circuit 110. The measuring radar wave is reflected at the distal end of the pre-determined length of the conductor and reflected back along the conductor to the measuring circuit 112. Additionally or alternately, the pre-determined delay of an embodiment of the verification circuit 110 may be effected by a dedicated electronic circuit within the verification circuit 110 that is configured to receive the measuring radar wave from the output circuit 111 and to reflect the measuring radar wave to the measuring circuit 112 after the pre-determined delay. The electronic circuit may be embodied with more than one pre-determined delay such that the verification of the radar device 100 may be repeated using different values for the pre-determined delay.

Figure 2:
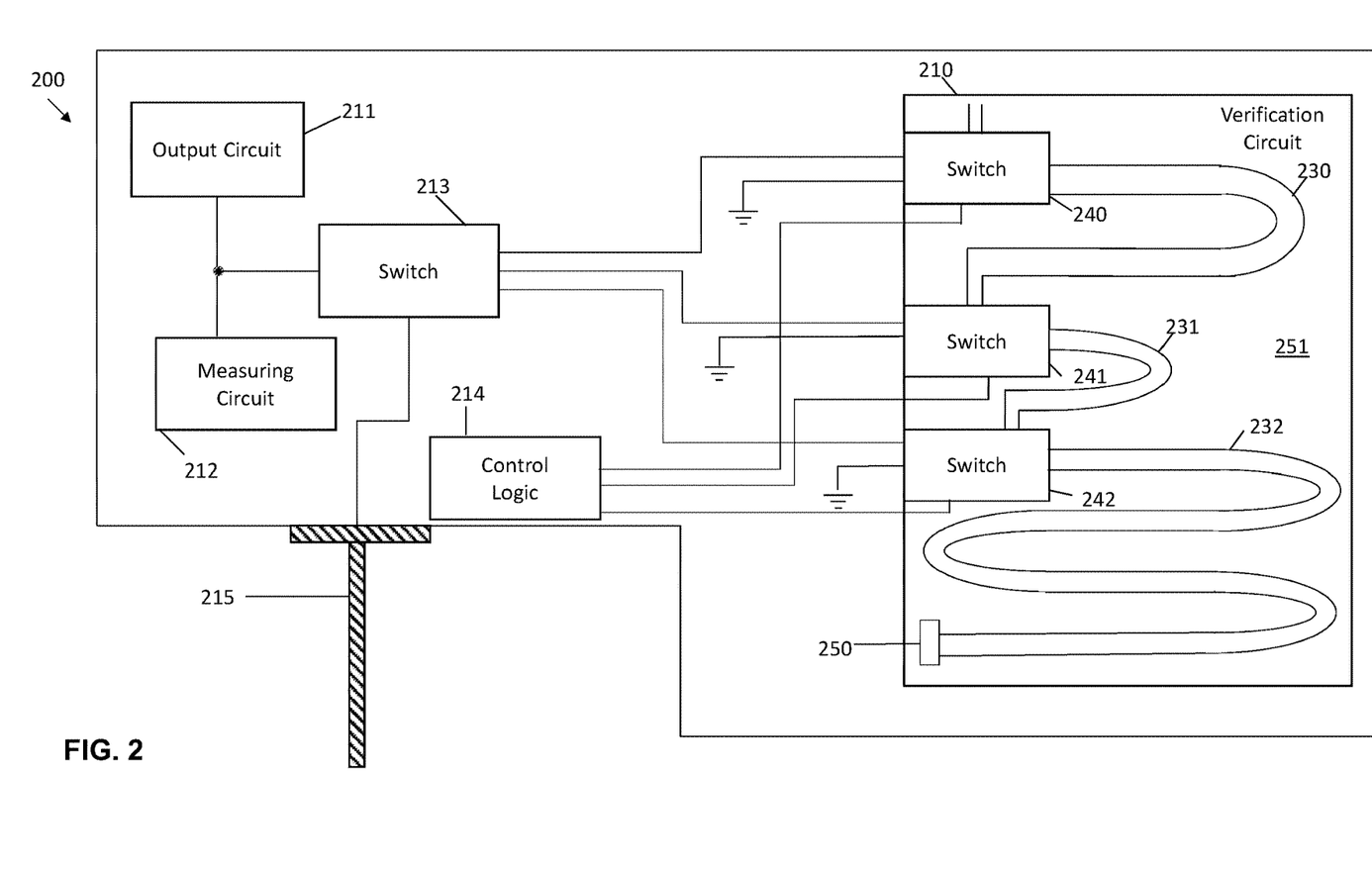
FIG. 2 shows a verification circuit including three reference trace pairs on a printed circuit board according to an embodiment of the present disclosure.

FIG. 2 shows a radar device 200 including an embodiment of a verification circuit 210 that includes at least three conductor trace pairs 230, 231, 232 on a printed circuit board 251. Each conductor trace pair 230, 231, 232 may include a signal trace configured to conduct a measuring radar wave and a ground trace connected to ground. The printed circuit board 251 may be a main circuit board of the radar device 200 and may include other electronic components used by the radar device 200. In such an embodiment, the conductor trace pairs 230, 231, 232 may be included on a separate layer of the printed circuit board 251. In an alternate embodiment, the printed circuit board 251 may be an add-on printed circuit board in the radar device 200 that includes only conductor traces pairs 230, 231, 232 of the verification circuit 210 and the electronic components necessary for operating the conductor trace pairs 230, 231, 232.

In a conductor trace pair 230, 231, 232 the signal trace and the ground trace have the same length and are disposed on the circuit board in parallel paths. The signal trace and the ground trace in a conductor trace pair 230, 231, 232 are separated from each other and insulated from each other by the printed circuit board 251. The space between the signal trace and the ground trace and the dielectric value of the printed circuit board 251 between the signal trace and the ground trace influences a propagation speed of a measuring radar wave in the signal trace. In at least certain embodiments, the length of the traces in a conductor trace pair 230, 231, 232 differs from the lengths of the traces in the other conductor trace pairs 230, 231, 232 in the verification circuit 210.

The signal trace and the ground trace may be connected at their respective ends by a terminating resistor 250 as shown in FIG. 2.

A switch 213 of the radar device 200 may be configured to selectively connect the output circuit 211 and the measuring circuit 212 either to the wave guide 215 when the radar device 200 is operating in a measuring mode or to any of the conductor trace pairs 230, 231, 232 of the verification circuit 210 when the radar device 200 is operating in a verification mode.

The verification circuit 210 may include additional switches 240, 241, 242 configured to connect a desired conductor trace pair 230, 231, 232 to the switch 213 or to connect one conductor trace pair 230, 231, 232 to another conductor trace pair 230, 231, 232. For example, as shown in FIG. 2, the conductor trace pair 232 may be connected through the switch 242 to the switch 213 and thus to the output circuit 211 and to the measuring circuit 212. In such a configuration, the conductor trace pair 232 is not connected to other conductor trace pairs 230, 231 within the verification circuit 210.

The verification circuit 210 may be alternately configured such that the conductor trace pair 232 is connected through the switch 242 to the conductor trace pair 231. In such a configuration, the conductor trace pair 231 may be connected through the switch 241 to the switch 213 and thus to the output circuit 211 and to the measuring circuit 212. In such a configuration, the measuring radar wave may propagate through the conductor trace pair 231, through the switch 242, and through conductor trace pair 232. The measuring radar wave may be reflected at terminating resistor 250 and propagate back through a reverse path to the measuring circuit 212.

The connecting in series of conductor trace pair 231 to conductor trace pair 232 includes the connecting together of the signal trace of each pair 231, 232 and the connecting together of the ground trace of each pair 231, 232.

The connecting of two or more conductor trace pairs 230, 231, 232 in series give an additional option in the verification mode. For example, the verification may be performed once using a first conductor trace pair. The verification may be performed a second time using a second conductor trace pair. After these two verifications have completed, the verification may be executed a third time with first conductor trace pair connected in series with the second conductor trace pair. Therefore, three separate verifications may be performed using only two conductor trace pairs.

Alternately and additionally, the verification may be performed with all three of the conductor trace pairs connected in series.

The radar device 200 may have a measuring range in which the radar device 200 is configured to operate. For example, the radar device 200 may be configured to measure a liquid level within a tank or vessel where the liquid level may be from 30 centimeters (cm) to 200 cm. In such a configuration, the lengths of the conductor trace pairs 230, 231, 232 in the verification circuit 210 of the radar device 200 must be such that the analysis of the reflected measuring radar wave yields a level within the measuring range of the radar device 200. In addition, the lengths of any conductor trace pairs 230, 231, 232 connected in series must yield a level within the measuring range of the radar device 200.

Figure 3:
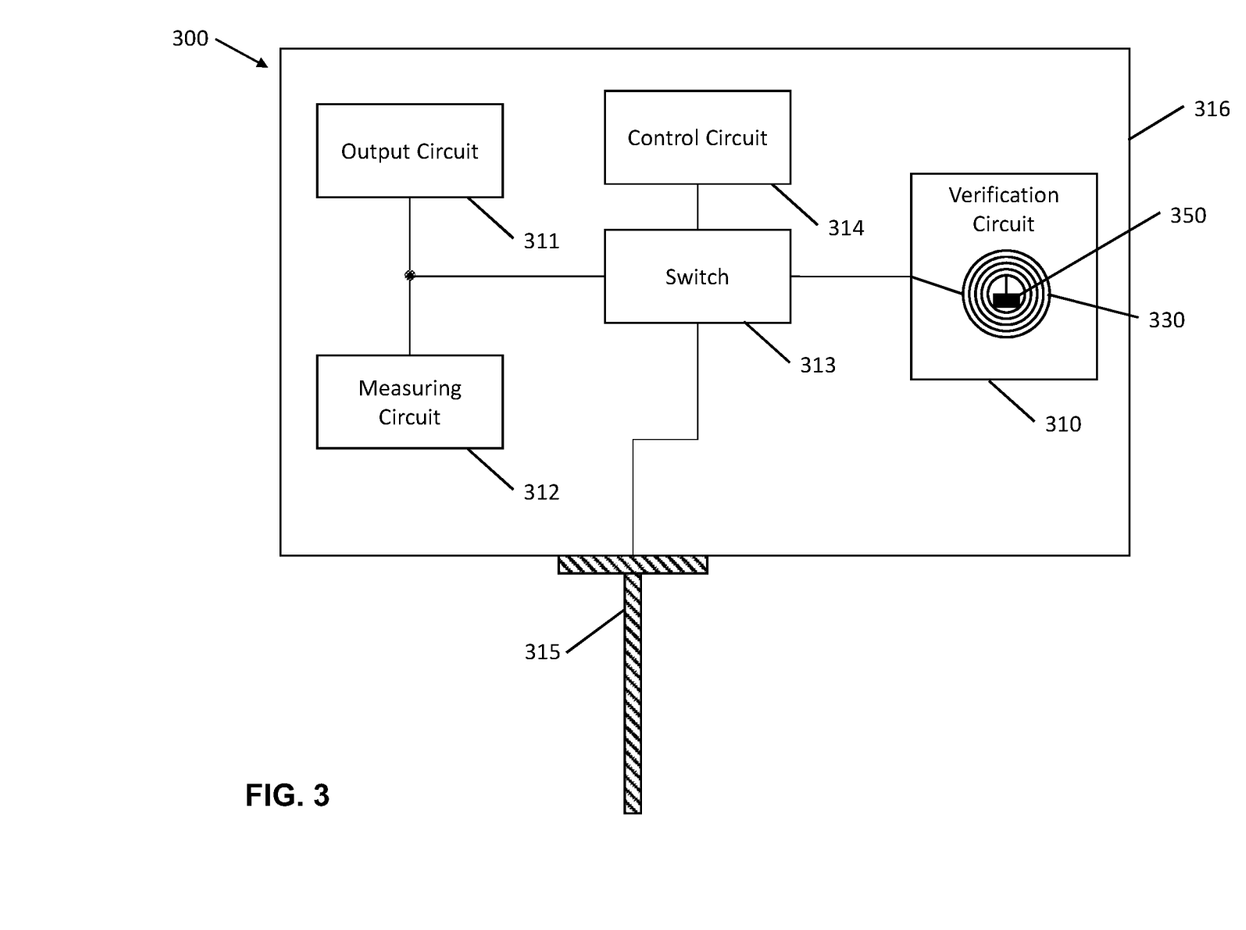
FIG. 3 shows a verification circuit including a co-axial cable disposed within the radar device according to an embodiment of the present disclosure.

FIG. 3 shows a radar device 300 including an embodiment of the verification circuit 310 that includes a coaxial cable 330 of a pre-determined reference length. The pre-determined reference length of the coaxial cable 330 must be within the measuring range of the radar device 300. The coaxial cable 330 is contained within the housing 316 of the radar device 300.

A switch 313 of the radar device 300 may be configured to selectively connect the output circuit 311 and the measuring circuit 312 either to the wave guide 315 when the radar device 300 is operating in a measuring mode or to one conductor of the coaxial cable 330 of the verification circuit 310 when the radar device 300 is operating in a verification mode. The other conductor of the coaxial cable 330 may be grounded. The two conductors of the coaxial cable 330 may be connected to each other by a terminating resistor 350 as shown in FIG. 3.

In certain embodiments having sufficient free space within the radar device 300, more than one coaxial cable (not shown in FIG. 3) may be used with the verification circuit 310. For example, a verification of the radar device may be performed using a first coaxial cable having a first pre-determined length. After the first verification, one or more switches in the verification circuit 310 may disconnect the first coaxial cable from the switch 313 and connect a second coaxial cable having a second pre-determined length to the switch 313, allowing the radar device 300 to perform a second verification using a different length of coaxial cable.

Figure 4:
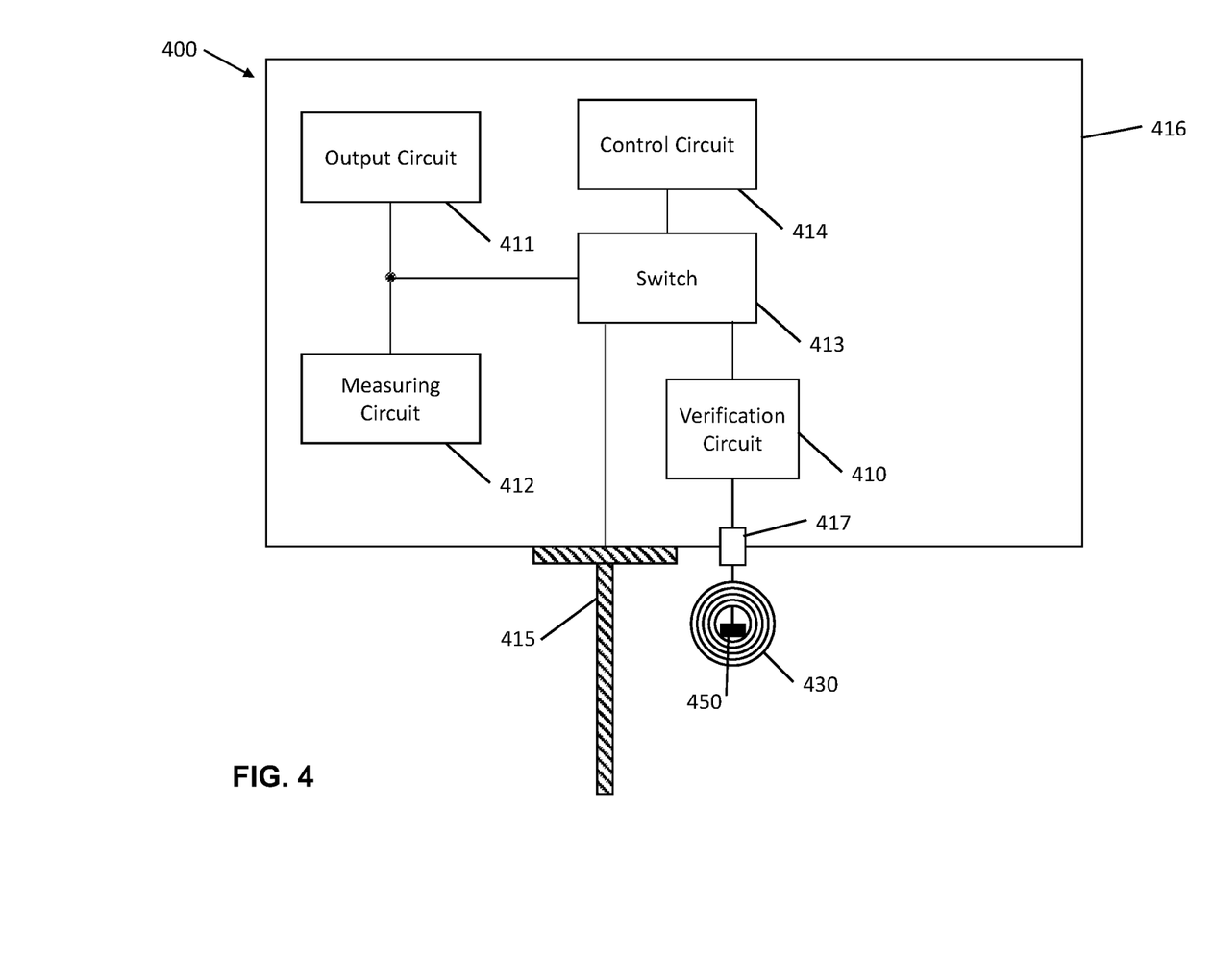
FIG. 4 shows a verification circuit including a co-axial cable disposed outside the radar device according to an embodiment of the present disclosure.

FIG. 4 shows a radar device 400 including an embodiment of the verification circuit 410 that includes a coaxial cable 430 of a pre-determined reference length. The coaxial cable 430 may be disposed outside of the housing 416 of the radar device 400 and connected to the circuits of the radar device 400 via a connector 417. In the verification mode, one conductor of the coaxial cable 430 may be connected through the switch 413 to the output circuit 411 and to the measuring circuit 412 and thus conduct the measuring radar wave. The other conductor of the coaxial cable 430 may be grounded. The two conductors of the coaxial cable 430 may be connected to each other by a terminating resistor 450 as shown in FIG. 4.

The pre-determined reference length of the coaxial cable 430 must be within the measuring range of the radar device 400.

The coaxial cable 430 may be left in place and connected with the radar device 400 through the connector 417 during operation of the radar device 400. The connection of the coaxial cable 430 has no effect on the measurement operation of the radar device 400. However, the coaxial cable 430 may be disconnected from the radar device 400 after a verification has been performed so that the coaxial cable 430 may be used in the verification of a different radar device, for example.

Figure 5:
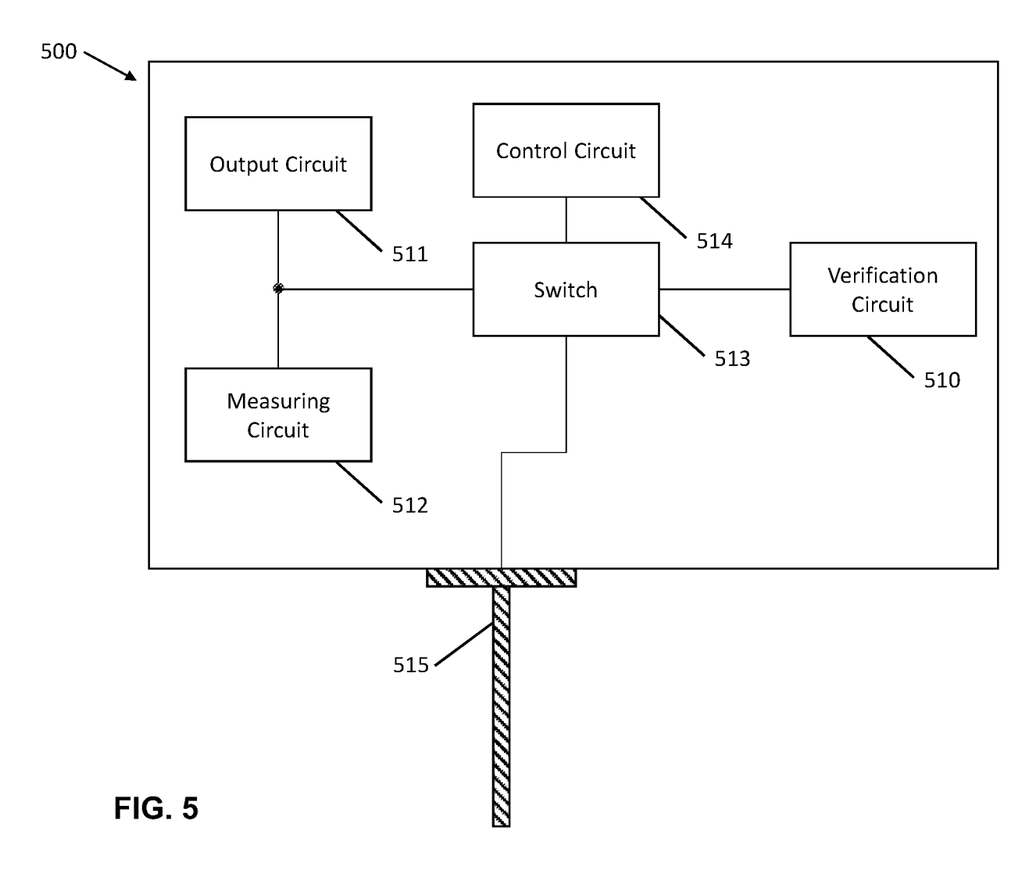
FIG. 5 shows a verification circuit including electronic components to simulate a reference distance according to an embodiment of the present disclosure.

FIG. 5 shows a radar device 500 including an embodiment of the verification circuit 510 that includes various electronic components configured to simulate a distance travelled for the measuring radar wave. The electronic components of the verification circuit 510 are configured to receive the measuring radar pulse from the output circuit 511 and to reflect the measuring radar pulse to the measuring circuit 512 after a brief delay. The brief delay simulates the travel of the measuring radar wave a pre-determined reference distance without the need of sending the measuring radar wave along a conductor trace or a coaxial cable of that reference distance.

The various electronic components of the verification circuit 510 may be embodied to simulate more than one pre-determined reference distance. The verification of the radar device 500 may then be performed with the verification circuit 510 configured for a first pre-determined reference distance, and the verification may be performed again with the verification circuit 510 configured for a second pre-determined reference distance.

What is claimed is:

1. A method for verifying a time-of-flight radar device, comprising:
   switching the radar device to a verification mode;
   connecting an output circuit of the radar device to a verification circuit of the radar device;
   connecting the verification circuit to a measuring circuit of the radar device;
   generating a radar pulse in the radar device using the output circuit and sending the radar pulse to the verification circuit, wherein the verification circuit is embodied to receive the radar pulse from the output circuit and to reflect the radar pulse to the measuring circuit after a pre-determined delay, wherein the pre-determined delay is configured to simulate a fixed travel distance of the radar pulse;
   reflecting the radar pulse from the verification circuit to the measuring circuit after the pre-determined delay;
   comparing a time-of-flight of the reflected radar pulse with an expected time-of-flight of the verification circuit; and
   generating a verification report based on the comparison.

2. The method of claim 1, wherein the verification circuit includes at least three pairs of conductor traces on a printed circuit board (PCB),
   wherein each pair of conductor traces includes a signal trace and a ground trace disposed in parallel paths on the PCB and joined at a distal end by a terminating resistor, and
   wherein the connecting of the output circuit to the verification circuit includes connecting the output circuit to a signal trace in one of the at least three pairs of conductor traces.

3. The method of claim 2, further comprising:
   repeating the connecting of the output circuit, the connecting of the verification circuit, the generating and the sending of the radar pulse, the reflecting of the radar pulse, and the comparing of the time-of-flight for each of the at least three pairs of conductor traces.

4. The method of claim 2, further comprising:
   connecting in series at least two of the at least three pairs of conductor traces by connecting the respective signal traces in series and by connecting the respective ground traces in series; and
   executing the connecting of the output circuit, the connecting of the verification circuit, the generating and the sending of the radar pulse, the reflecting of the radar pulse, and the comparing of the time of flight using the at least two conductor trace pairs connected in series.

5. The method of claim 1, wherein the verification circuit includes a combination of electronic components configured to reflect the radar pulse after the pre-determined delay.

6. The method of claim 1, wherein the verification circuit includes at least one coaxial cable of a verified length disposed within a housing of the radar device, and
   wherein the connecting of the output circuit to the verification circuit includes connecting the output circuit to the at least one coaxial cable.

7. The method of claim 1, wherein the radar device further includes a housing enclosing at least the output circuit, the housing including an external connection,
   wherein the verification circuit includes at least one coaxial cable of a verified length disposed outside of the housing and connected to the radar device at the external connection, and
   wherein the connecting of the output circuit to the verification circuit includes connecting the output circuit to the at least one coaxial cable through the external connection.

8. The method of claim 2, wherein the radar device has a measuring range, and wherein a length of each trace of the at least three pairs of conductor traces is within the measuring range of the radar device.

9. The method of claim 4, wherein the radar device has a measuring range, and wherein a length of the at least two signal traces connected in series is within the measuring range of the radar device, and
   wherein a length of the at least two ground traces connected in series is within the measuring range of the radar device.

10. The method of claim 2, wherein the at least three pairs of conductor traces are disposed on a layer of a main PCB of the radar device, and wherein the main PCB includes at least the output circuit and the verification circuit.

11. The method of claim 2, wherein the at least three pairs of conductor traces are disposed on a separate PCB.

12. A time-of-flight radar device, comprising:

an output circuit embodied to generate a measuring radar wave;

a wave guide embodied to receive the measuring radar wave from the output circuit and to guide the measuring radar wave into a medium;

a measuring circuit embodied to receive a reflected measuring radar wave and to make time-of-flight measurements on the reflected measuring radar wave;

a verification circuit embodied to receive the measuring radar wave from the output circuit and to reflect the measuring radar wave to the measuring circuit after a first pre-determined delay, wherein the first pre-determined delay is configured to simulate a fixed travel distance of the measuring radar wave;

a first switch configured to selectively connect the output circuit to the wave guide or to the verification circuit;

a control circuit configured to control the output circuit, the measuring circuit, the verification circuit, and the first switch; and a housing embodied to enclose and protect at least the output circuit, the measuring circuit, the verification circuit, the first switch, and the control circuit.

13. The radar device of claim 12, wherein the verification circuit includes at least three pairs of conductor traces on a printed circuit board (PCB) and at least three switches disposed on the PCB, wherein each pair of conductor traces includes a signal trace and a ground trace disposed in parallel paths on the PCB and joined at a distal end by a terminating resistor, and wherein each switch is configured to selectively connect a conductor trace pair to the first switch or to another conductor trace pair.

14. The radar device of claim 12, wherein the verification circuit includes at least one coaxial cable of verified length disposed within the housing.

15. The radar device of claim 12, wherein the verification circuit includes at least one coaxial cable of a verified length disposed external to the housing, and wherein the housing includes an external connection through which the at least one coaxial cable is connected to the output circuit through the first switch.

16. The radar device of claim 12, wherein the verification circuit includes a combination of electronic components configured to simulate a time-of-flight delay in a radar signal.

* * * * *